United States Patent [19]

Mukai et al.

[11] Patent Number: 4,526,836
[45] Date of Patent: Jul. 2, 1985

[54] MAGNETIC RECORDING MEDIA COMPRISING A REACTION PRODUCT OF A SPECIFIC TYPE OF FLUORINE RESIN AND A CURING POLYMER MATERIAL AS A BINDER IN THE MAGNETIC LAYER THEREOF

[75] Inventors: Yasuo Mukai, Yokohama; Yosuke Takazawa, Yamato, both of Japan

[73] Assignee: Victor Company of Japan, Ltd., Japan

[21] Appl. No.: 650,672

[22] Filed: Sep. 13, 1984

[30] Foreign Application Priority Data

Sep. 16, 1983 [JP] Japan .................................. 58-169261

[51] Int. Cl.$^3$ .............................................. G11B 5/68
[52] U.S. Cl. ................................. 428/421; 252/62.54; 360/134; 360/135; 360/136; 427/128; 428/422; 428/425.9; 428/694; 428/695; 428/900
[58] Field of Search ..................... 428/694, 695, 425.9, 428/422, 421, 900; 427/44, 54.1, 128, 131; 252/62.54; 360/134–136

[56] References Cited

U.S. PATENT DOCUMENTS

| 3,810,874 | 5/1974 | Mitsch | 528/225 |
| 4,085,137 | 4/1978 | Mitsch | 528/210 |
| 4,267,238 | 3/1981 | Chernega | 428/422 |
| 4,268,556 | 5/1981 | Pedrotty | 428/422 |

FOREIGN PATENT DOCUMENTS 57-34107  2/1982  Japan .

Primary Examiner—Ellis P. Robinson
Attorney, Agent, or Firm—Lowe, King, Price & Becker

[57] ABSTRACT

Magnetic recording media which comprise a non-magnetic support and a magnetic layer formed on at least one side thereof, in which the magnetic layer is made of a magnetic composition which comprises magnetic particles dispersed throughout a resin binder consisting essentially of a reaction product of a fluorine resin having at least two hydroxyl groups in one molecule of the resin and a curing polymer material having functional groups capable of reaction with the fluorine resin through the at least two hydroxyl groups.

12 Claims, No Drawings

MAGNETIC RECORDING MEDIA COMPRISING A REACTION PRODUCT OF A SPECIFIC TYPE OF FLUORINE RESIN AND A CURING POLYMER MATERIAL AS A BINDER IN THE MAGNETIC LAYER THEREOF

BACKGROUND OF THE INVENTION

1. Field of the Invention

This invention relates to magnetic recording media which have improved travellability and durability.

2. Description of the Prior Art

The recent tendency toward high density recording in magnetic recording and reproducing systems have brought about complicateness in mechanism of magnetic recording and reproducing apparatus. Magnetic recording media for use in these magnetic recording and reproducing apparatus are highly required to have more improved travelling performance, particularly relative to transducers or magnetic heads and allied parts and durability. In order to ensure good travelling performance, the magnetic recording media should have a low coefficient of friction on the surface thereof. Likewise, high durability of the media is ensured when they are low in wear rate and coefficient of friction on the surface thereof and exhibit good stability over a long term.

However, there have never been known magnetic recording media which satisfy the requirements for both the travelling performance and durability.

SUMMARY OF THE INVENTION

It is therefore an object of the present invention to provide magnetic recording media for high density recording which make use of a specific type of fluorine resin binder in a magnetic recording layer thereof whereby the above requirements are all satisfied.

The present invention is characterized in that a magnetic recording layer is made of a magnetic composition which comprises a magnetic powder of a metal or metal oxide, a binder of a fluorine resin having at least two hydroxyl groups in one molecule thereof and being soluble in organic solvents, and a curing agent for the fluorine resin. The binder is a reaction product of the fluorine resin crosslinked through the curing agent.

DETAILED DESCRIPTION AND PREFERRED EMBODIMENTS OF THE INVENTION

The term "magnetic recording media" used herein is intended to mean all magnetic media known to the art, including magnetic tapes, magnetic discs, magnetic cards and the like.

The magnetic recording media of the present invention have a magnetic recording layer formed on at least one side of a support. The recording layer is made of magnetic particles dispersed in or throughout a binder composition.

The magnetic particles may be of any types ordinarily used for these purposes, including particles of ferromagnetic iron oxide materials such as gamma-$Fe_2O_3$ and $Fe_3O_4$ with or without additional metals such as Co, ferromagnetic metals such as Fe, Co, Ni and the like and alloys thereof such as Fe-Co, Fe-Ni, Co-Ni, Fe-Co-Ni. In addition, other ferromagnetic materials such as $CrO_2$ with or without other metals may also be used. These materials may be used singly or in combination. The particles of these materials have usually an average size of from 0.05 to 5 microns.

In practice, magnetic particles are used in combination with a binder. The binder used in the present invention is a mixture of a fluorine resin which has at least two —OH groups in one molecule of the resin polymer and which is soluble in an organic solvent, with a curing agent for the fluorine resin.

The fluorine resins having at least two hydroxyl groups in one molecule thereof are copolymers of fluoroolefins, cyclohexyl vinyl ether, alkyl vinyl ethers and hydroxyakyl vinyl ethers with or without other copolymerizable monomers. These resins are described in detail, for example, in Japanese Laid-open Patent Application No. 57-34107, which is incorporated herein by reference. Such fluorine resin copolymers are commercially available from Asahi Glass Co., Ltd., Japan under the designations of Lumiflon 100, 200, 300 and 400. Preparation of the fluorine resins are briefly described.

The fluorine resin can be prepared by copolymerizing 40 to 60 mole% of a fluoroolefin, 5 to 45 mole% of cyclohexyl vinyl ether, 5 to 45 mole% of an alkyl vinyl ether and 3 to 15 mole% of a hydroxyalkyl vinyl ether. Examples of the fluoroolefin are perhaloolefins such as chlorotrifluoroethylene, tetrafluoroethylene, trifluoroethylene, hexafluoropropylene and the like.

The alkyl vinyl ethers useful for the above purposes have a linear or branched alkyl group having from 2 to 8 carbon atoms. Similarly, the hydroxyalkyl vinyl ethers have a linear or branched alkyl group having from 2 to 8 carbon atoms. The fluoroolefins, alkyl vinyl ethers and hydroxyalkyl vinyl ethers may, respectively, be used singly or in combination.

The fluorine resins may further comprise up to 30 mole% of other copolymerizable monomers including olefins such as ethylene, propylene, isobutylene and the like, haloolefins such as vinyl chloride, vinylidene chloride and the like, unsaturated carboxylic acid esters such as vinyl methyl methacrylate, vinyl carboxylates such as vinyl acetate, vinyl n-butyrate and the like, and other copolymerizable monomers having functional groups such as —$NH_2$ group,

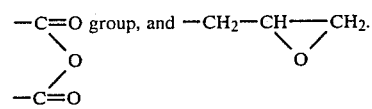

Of these, copolymerizable monomers having functional groups such as —COOH group, —$NH_2$ group,

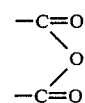

group, and

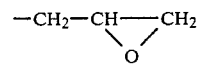

are preferred.

The copolymerization is effected by mixing predetermined amounts of the starting monomers in the presence of a polymerization initiator with or without use of a solvent for the polymerization. Typical examples of the polymerization initiator include water-soluble persulfates such as potassium persulfate and hydrogen peroxide with or without addition of reducing agents such a sodium hydrogensulfite. These initiators are ordinarily used in amounts from 0.005 to 5 wt% of the total amount of the starting monomers. The copolymerization may be carried out by various polymerization techniques such as block polymerization, suspension polymerization, emulsion polymerization and solution polymerization. Preferably, solution polymerization using an alcohol, an ester or saturated halogenated hydrocarbon solvent is used. The conditions for the copolymerization include a temperature from $-30°$ to $+150°$ C. and a pressure from 1 to 100 kg/cm$^2$.

The fluorine resins useful in the practice of the invention have generally a molecular weight ranging from 2000 to 100,000. From the standpoint of magnetic characteristics, the molecular weight is preferably from about 10,000 to 100,000. Within the above content of a hydroxyalkyl vinyl ether, the fluorine resins should have at least two hydroxyl groups in one molecule of the resin polymer. Within the content of the hydroxyalkyl vinyl ether in the defined range, it was experimentally found that at least one OH group was contained per a molecular weight of about 1000. These resins strongly adhere to various substrates such as of aluminium, stainless steel, copper, ceramics, glass, plastics and the like, and are dissolved in various solvents such as aromatic hydrocarbons, ketones, esters, alcohols and the like.

In practical applications, curing agents are used in combination with the fluorine resin. Such curing agents are polymer materials having functional groups capable of reaction with the hydroxyl groups of the fluorine resin. Examples of such polymer materials having functional groups capable of reaction with the functional groups and particularly hydroxyl groups of the fluorine resin include polyisocyanates preferably having at least three isocyanate groups in one molecule thereof, phenolic resins, melamine resins, urea resins and the like. The content of the fluorine resin in the mixture of the fluorine resin and the polymer material serving as a curing agent is from 10 to 98 wt%. Preferably, the content is from about 30 to 90 wt%. This is because amounts less than 30 wt% leads to the tendency toward lowering of weatherability of the resulting magnetic layer whereas amounts larger than 90 wt% may lower a coefficient of elasticity of the resulting magnetic layer.

Magnetic particles is usually contained in an amount of from 20 to 80 wt% of the total composition of the magnetic particles and a binder composition comprising a fluorine resin having at least two hydroxyl groups in one molecule of the resin polymer and a curing agent.

In order to manufacture magnetic recording media according to the invention, a predetermined amount of magnetic particles is dispersed in a fluorine resin binder composition dissolved in a solvent. If desired, suitable additives including lubricants, dispersants, stabilizers, non-magnetic particles and the like may be added. The resulting dispersion is then coated onto a non-magnetic support at least one one side thereof. The fluorine resin may be cured at a normal temperature but is preferably cured at elevated temperatures up to 250° C. After the coating, the support on which the dispersion has been applied is dried and cured at temperatures ranging from a normal temperature to 250° C. for several minutes to 24 hours or longer, depending on the type of substrate used. The coating may be carried out by any known techniques such as an air knife coating, blade coating, dip coating, various roller coatings, spin coating, spray coating and the like. The resulting recording layer has generally a thickness of from 0.2 to 10 microns.

Supports suitable for the purposes of the invention include films, foils, plates or sheets of a variety of materials including, for example, synthetic or semisynthetic resins such as polyesters, polyolefins, cellulose derivatives and the like, metals such as aluminium, copper and the like, and glasses or ceramics.

The present invention is particularly described by way of examples.

EXAMPLE 1

About 50 parts by weight of magnetic gamma-Fe$_2$O$_3$ powder, about 10 parts by weight of alpha-Al$_2$O$_3$ powder, about 30 parts by weight of a fluorine resin having hydroxyl groups (Lumiflon LF-400, made by Asahi Glass Co., Ltd.), about 10 parts by weight of a phenolic resin (Sumirac PC-25, made by Sumitomo Bakelite Co., Ltd.) and about 200 parts by weight of a mixed solvent of toluene and butanol were mixed and dispersed in a ball mill for about 24 hours to prepare a magnetic paint. The magnetic paint was applied onto an aluminium substrate and dried, followed by heating and curing at a temperature of about 200° C. for 30 minutes and polishing to obtain magnetic discs.

COMPARATIVE EXAMPLE 1

The general procedure of Example 1 was repeated using, instead of Lumiflon LF-400, an epoxy resin (Epikote 1004, made by Shell Chem. Co., Ltd.), thereby obtaining magnetic discs.

EXAMPLE 2

About 75 parts by weight of a magnetic iron-base powder, about 5 parts by weight of alpha-Al$_2$O$_3$ powder, about 17 parts by weight of a fluorine resin having hydroxyl groups (Lumiflon LF-100, made by Asahi Glass Co., Ltd.) and about 200 parts by weight of a mixed solvent of toluene and methyl ethyl ketone were mixed and dispersed in a ball mill for about 48 hours. Thereafter, about 3 parts by weight of polyisocyanate (Coronate L, made by Nippon Polyurethane Co., Ltd.) was added to the mixture, followed by mixing and dispersing for about 1 hour to prepare a magnetic paint. The magnetic paint was applied onto a polyester base, dried, calendered, and cured at a temperature of 60° C. for 24 hours. The base was slit into magnetic tapes of a predetermined width.

COMPARATIVE EXAMPLE 2

About 75 parts by weight of a magnetic iron-base powder, about 5 parts by weight of alpha-Al$_2$O$_3$ powder, about 10 parts by weight of vinyl chloride copolymer (Vinylite VAGH, made by UCC Corp.), about 5 parts by weight of polyurethane elastomer (Nippolan 2304, made by Nippon Polyurethane Co., Ltd.) and about 200 parts by weight of a mixed solvent of toluene and methyl ethyl ketone were mixed and dispersed in a ball mill for about 48 hours, followed by adding about 5 parts by weight of Coronate L. Subsequently, the mixture was further mixed and dispersed for about 1 hour to prepare a magnetic paint. The magnetic paint was applied onto a polyester base, dried, calendered and cured at a temperature of about 60° C. for 24 hours. The base was slit into magnetic tapes having a predetermined width.

The magnetic discs and tapes obtained in the examples and comparative examples were each subjected to measurement of a coefficient of kinetic friction and gloss retentivity on the magnetic layer thereof in order to check the travelling performance and durability of each sample. With the discs, the coefficient of kinetic friction of each sample was measured according to the method prescribed in ISO/TC97/SC10N228 at 5.8. The magnetic tapes were measured according to MTS 104 at 4.5 with respect to the coefficient of kinetic friction. The gloss retentivity was measured as follows: a sunshine weather-O-meter was operated under conditions of a black panel temperature of 60° C., a relative humidity of 60%, and a water spray of 10 minutes per hour; each of the magnetic discs and tapes was subjected to the weathering for 2000 hours; and the retentivity was determined from gloss values prior to and after the weathering of 2000 hours. The results are shown in Table below.

TABLE

|  | Coefficient of Kinetic Friction | Gloss Retentivity (%) |
| --- | --- | --- |
| Example 1 | 0.18 | 95 |
| Example 2 | 0.29 | 92 |
| Comparative Ex. 1 | 0.26 | 31 |
| Comparative Ex. 2 | 0.42 | 2 |

As will be apparent from the above table, the magnetic recording media according to the invention are small with respect to the coefficient of kinetic friction with an improved travelling performance. This is because the magnetic layer comprises a reaction product between a fluorine resin having at least two —OH groups in one molecule thereof and a curing agent, by which the lubricating effect is improved. Moreover, the magnetic media of the invention exhibit only a small change in gloss value when subjected to the weathering test and have thus good stability with time and good durability.

What is claimed is:

1. A magnetic recording medium which comprises a non-magnetic support and a magnetic layer formed on at least one side of said support, said magnetic layer being made of a magnetic composition which comprises magnetic particles dispersed throughout a binder of a reaction product between a fluorine resin having at least two hydroxyl groups in one molecule of said resin and being soluble in an organic solvent and a polymer material having functional groups capable of condensation reaction with said fluorine resin through the at least two hydroxyl groups.

2. The magnetic recording medium according to claim 1, wherein said magnetic particles are contained in an amount of from 20 to 80 wt% of said magnetic composition.

3. The magnetic recording medium according to claim 1, wherein said reaction product comprises 10 to 98 wt% of said fluorine resin and the balance of said polymer material.

4. The magnetic recording medium according to claim 3, wherein the content of said fluorine resin in said binder is from 30 to 90 wt%.

5. The magnetic recording medium according to claim 1, said fluorine resin is a copolymer of 40 to 60 mole% of a fluoroolefin, 5 to 45 mole% of cyclohexyl vinyl ether, 5 to 45 mole% of an alkyl vinyl ether and 3 to 15 mole% of a hydroxyalkyl vinyl ether.

6. The magnetic recording medium according to claim 5, wherein said fluoroolefin is trifluoroethylene, chlorotrifluoroethylene, tetrafluoroethylene or hexafluoropropylene.

7. The magnetic recording medium according to claim 5, wherein said alkyl vinyl ether has an alkyl group having from 2 to 8 carbon atoms.

8. The magnetic recording medium according to claim 5, wherein said hydroxyalkyl vinyl ether has an alkyl group having from 2 to 8 carbon atoms.

9. The magnetic recording medium according to claim 5, wherein said fluorine resin further comprises up to 30 mole% a copolymerizable monomer having a functional group selected from the group consisting of —COOH group, —NH₂ group,

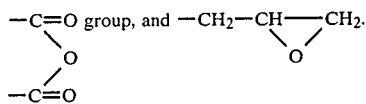

10. The magnetic recording medium according to claim 1, wherein said fluorine resin has a molecular weight of from 2000 to 100,000.

11. The magnetic recording medium according to claim 1, wherein said medium is a magnetic disc having the magnetic layer on opposite sides thereof.

12. The magnetic recording medium according to claim 1, wherein said medium is a magnetic tape having the magnetic layer on one side thereof.

* * * * *